3,325,232
SHAFT SEALING AND COOLING MEANS
Richard H. Pabst, North Palm Beach, and Walter J. Silay, West Palm Beach, Fla., assignors to United Aircraft Corporation, East Hartford, Conn., a corporation of Delaware
Filed June 24, 1965, Ser. No. 466,732
3 Claims. (Cl. 308—187)

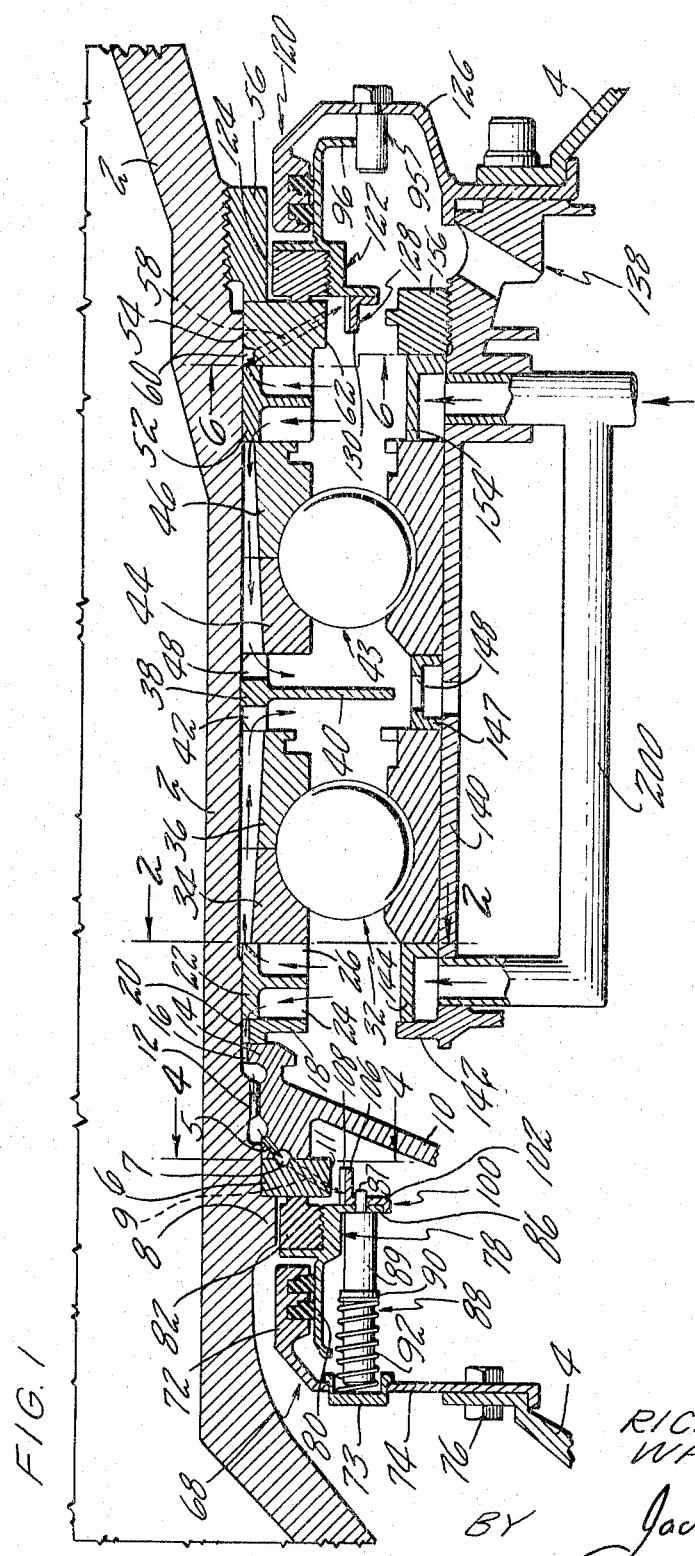

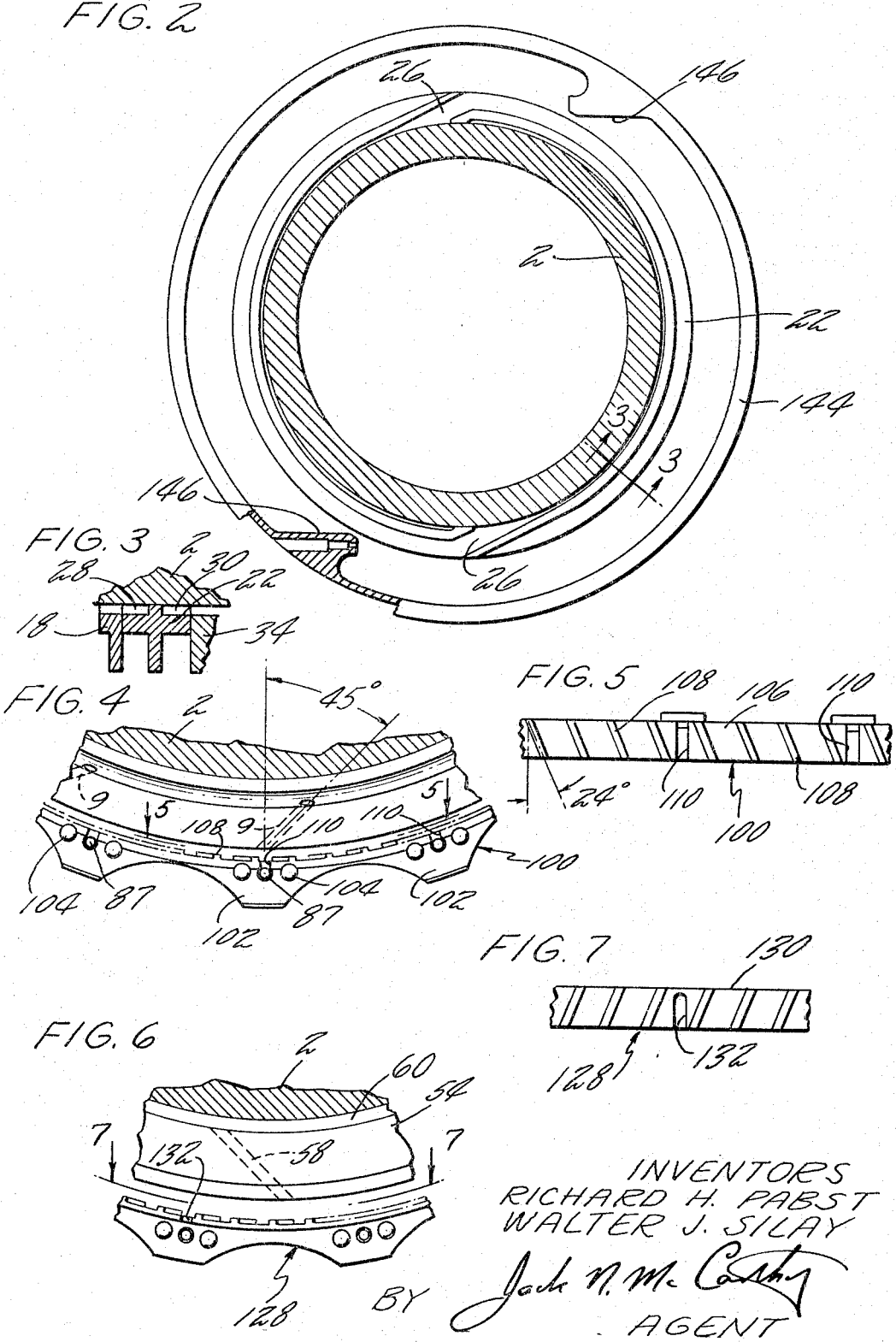

This invention relates to means for cooling the mating parts of a rotating seal and reducing seal wear.

An object of this invention is to direct a flow of cooling oil or fluid through one member of a rotating seal and directing the flow at the place where the other seal member mates therewith.

Another object of this invention is to provide a deflector adjacent the outlet of passages extending through one of the cooperating annular seal members so that the cooling oil is maintained in an area where it can be directed to the mating surfaces of the two members having relative movement.

A further object of this invention is to provide a deflector having vanes so that the oil being directed on to the deflector will be aimed directly towards the mating surfaces of the seal plate and seal.

Another object of this invention is to provide means in the deflector to control the amount of cooling fluid retained thereby so that the area between the deflector and seal assembly does not become full of fluid.

Other objects and advantages will be apparent from the specification and claims and from the accompanying drawings which illustrate an embodiment of the invention.

FIGURE 1 is a sectional view of the lower half of a bearing and seal unit located between a rotating shaft and fixed housing containing applicants' invention.

FIGURE 2 is a view, approximately one-half in size, taken along the line 2—2 of FIGURE 1.

FIGURE 3 is a view taken along the line 3—3 of FIGURE 2 and made, however, with the dimensions of FIGURE 1.

FIGURE 4 is a sectional view taken along the line 4—4 of FIGURE 1 showing one deflector member and its relation to its cooperating seal plate.

FIGURE 5 is a view taken along the line 5—5 of FIGURE 4.

FIGURE 6 is a view taken along the line 6—6 of FIGURE 1 showing the other deflector member and its relation to its cooperating seal plate.

FIGURE 7 is a view taken along the line 7—7 of FIGURE 6.

Referring to FIGURE 1 a shaft 2 is mounted for rotation in a housing 4. The shaft 2 can be a drive between a compressor and turbine or used as a drive between any other two elements. The shaft 2 has thereon a seal plate 6 which abuts an annular projection 8 which fixes its position on the shaft. The root end of a gear 10 has one side abutting the seal plate 6 and is splined to the shaft at 12. A spacer part 14 extends from the side of said gear away from the seal plate and has a smaller opening to correspond with a necked-down portion on the shaft. This prevents the gear 10 from being mounted the wrong way. The inner diameter of the spacer part 14 is castellated so as to form axial passageways 16 along the surface of the shaft.

The abutting sides of the root end of gear 10 and seal plate 6 each have an annular groove therein which coact to form an annular passageway 7. A plurality of passages 5 extend between the annular groove on the face of the root end of the gear 10 with an annular space formed between the inner diameter of the root end of the gear 10 and the shaft 2. This annular space is connected through the splined area 12 to a second annular space which is adjacent the ends of the passageways 16. Passageways 9 extend through the seal plate 6 from the annular groove to the annular face 11 formed on the outer diameter. The passageways 9 are angled to make their length as long as possible to provide as much cooling as it can.

A spacer member 18 has an inner diameter which engages the shaft 2 which also contains grooves 20, which provide axial passageways along the shaft. An annular axially extending portion abuts the spacer part 14 of the gear 10 to properly position the spacer as will be hereinafter disclosed. The spacer extends radially a distance so as to be approximately equal to the radial extension of the oil scoop 22 which is positioned adjacent the spacer member to provide an enclosed side therefor.

The oil scoop 22 has its inner diameter mating with the shaft and as viewed in FIGURES 2 and 3, it can be seen that the cross section of the scoop differs around its circumference between the two open scoop passageways 24 and the two open scoop passageways 26. The oil scoop has a cross section such as shown in FIGURE 3 providing two annular manifolds 28 and 30 for receiving oil flow from the scoop openings 24 and 26, respectively, for a purpose to be hereinafter described.

Next in order along the shaft there is the inner bearing ring of bearing device 32 which consists of two half sections 34 and 36. The side of the mating half 34 coacting with scoop 22 has approximately the same radial extension as the scoop to provide an enclosed side therefor. A spacer 38 abuts half section 36 and has an annular slinger plate 40 attached thereto. Cutouts in the portion mating with the shaft and member 36 form passageways 42 which align with passageways formed in the shaft mating surfaces of the inner bearing ring half sections 34 and 36 of the bearing device 32. Grooves 20 cooperate with annular manifold 28 and the passageways formed in the shaft mating surfaces of the inner bearing ring half sections 34 and 36 cooperate with the annular manifold 30.

Adjacent the spacer 38 mounted on shaft 2 there is the inner bearing ring of bearing device 43 which consists of two half sections 44 and 46. The half section 44 abuts the spacer 38 and there are cutouts on this side of the spacer 38 which form passageways 48 which align with passageways formed in the shaft mating surfaces of the inner bearing ring half sections 44 and 46 of the bearing device 43.

An oil scoop 52 is positioned on shaft 2 adjacent the end of the inner bearing ring half section 46, and it is noted that this oil scoop is similar to the oil scoop 22 referred to above.

A seal plate 54 is next adjacent the oil scoop 52 and has its one side positioned against the oil scoop while annular nut 56 is threadably engaged to shaft 2 to fixedly position all of the members just referred to between the nut and annular projection or flange 8. The seal plate 54 extends radially a distance so as to be approximately equal to the radial extension of the oil scoop 52 to provide one enclosed side for the oil scoop. The side of the mating half 46 of the bearing device 43 has approximately the same radial extension as the scoop 52 to provide the other enclosed side therefor. The seal plate 54 has passageways 58 which extend from an annular groove 60 at the inner forward corner thereof to the annular face 62 formed on the outer diameter. The passageways 58 are angled to make their length as long as possible to provide as much cooling as it can. The groove 60 coacts with the outer diameter of the shaft 2 to form an enclosed space which opens into the annular manifold formed on one side of the oil scoop 52. The annular manifold on the other side of the oil scoop 52 engages the passageways formed in the shaft mating surfaces of the inner bearing ring half sections 44 and 46.

Now that the rotating portion of the device has been disclosed, we will discuss the stationary portion which is supported by the housing 4. The housing 4 supports two sealing means 68 and 120, one for engaging each of the seal plates 6 and 54.

The sealing means 68 includes an annular member 72, surrounding shaft 2 having piston rings on its outer periphery, which is located a short distance from the seal face of the seal plate 6. This annular member includes an outwardly extending annular flange 74 which is bolted to the housing 4 by bolts 76. An annular carrier 78 is formed having a cylindrical portion 80 axially movable about the member 72 and in engagement with the piston rings. The annular portion of the carrier 78 adjacent the face of the seal plate 6 is formed angular (L-shaped) in cross section with one part extending at right angles as a flange towards the shaft 2 between the member 72 and seal member 82, and the other part extending from the outer end of the flange as a coaxial cylinder, with respect to the shaft, towards the seal plate 6. A seal member 82 is threadably mounted on threads formed in the inside of the coaxial cylinder. The threads are arranged so that movement of the seal plate 6 against the seal member tightens the threads. The main body of the seal member 82 extends to the inner periphery of the flange and to the outer extension of the coaxial cylinder. The seal member is formed having an annular projecting sealing portion which axially engages the face of the seal plate 6.

A flange 86 extends outwardly from the free end of the coaxial cylinder. This flange 86 has a plurality of holes therein for receiving the ends, which are formed as short pins 87, of spring units 88 which are each mounted between a seat 73 on the flange 74 and flange 86 to bias the carrier and in turn the seal member 82 towards the seal plate 6. Each spring unit 88 comprises a pin 89 having a flange 90 located adjacent its center with a smaller short pin 87 projecting from one end and a spring 92 surrounding the other end. As mentioned hereinbefore, each pin 87 is received in a hole in flange 86 and each spring 92 is positioned in a spring seat 73 in flange 74.

To prevent relative rotation between the carrier 78 and flange 74 fixed to housing 4, several fixed pin units 95 extend from the flange 74 into projections 96 which extend outwardly from the carrier between several spring unit locations (not shown, see other carrier).

A deflector unit 100 is fixed to the flange 86. This deflector unit 100 comprises a plurality of downwardly extending flanges 102 which are placed adjacent the flange 86 and riveted thereto by rivets 104. Each flange 102 has an extension over the edge of the flange 86. An annular deflector plate 106 fixed to the flanges 102 extends axially from the face of flange 86 and is spaced outwardly a short distance from the annular face 11 of the seal plate 6. The inner face of the deflector plate 106 has vanes 108 which are placed at an angle so that a coolant fluid exiting from passageways 9 will be deflected towards the carrier 80 and seal member 82 where it engages seal plate 6. Slots 110 are placed across the deflector plate 106 around its periphery at various locations to prevent the coolant from building up between the plate 106 and face 11 of the seal plate 6 so that the vanes will be effective.

The sealing means 120 is constructed substantially the same as sealing means 68. An annular carrier 122 is mounted in the same manner as annular carrier 78 and contains a seal member 124 which is biased towards the seal plate 54 by a plurality of spring units such as 88. To prevent relative rotation between the carrier 122 and the flange 126 several fixed pin units 95 extend from the flange 126 into projections 96 which extend from the carrier between several spring unit locations. The main difference between the two sealing means is that the deflector plate 130 of the deflector unit 128 is located further from the annular face 62 of the seal plate 54 than the deflector plate 106 is located from annular face 11 of the seal plate 6. This greater distance permits the use of fewer openings in the plate to reduce the amount of coolant which would be retained between the deflector plate and face 62 of the seal plate 54. In the embodiment shown in FIGURE 7, there were four slots 132 used while in FIGURE 5 it can be seen that there was one slot 110 for each four vanes.

As viewed in FIGURE 4 the passageways 9 are formed in seal plate 6 with their centerline at an angle of approximately 45° to a radial extending line passing through the center of the opening formed on face 11. The passageways 58 are placed in the same manner with respect to seal plate 54. In the embodiment shown the vanes in each deflector unit were placed at an angle of approximately 24° to a longitudinal line drawn on the face of the deflector plate.

Also attached to the housing 4 is an annular member 138 which extends from a point where flange 126 is fixed to housing 4 to a point just short of gear 10. Member 138 comprises basically an annular sleeve 140 having an inwardly extending flange 142 at its end adjacent the gear 10 with a coolant distributing ring member 144 placed therein which forms with the sleeve 140 and flange 142 an annular manifold. The ring member 144 is approximately the same length as the oil scoop 22 and in its operating position should be aligned radially outward from the oil scoop 22. The inner surface of the member 144 includes two pairs of diametrically opposed nozzles 146 which are arranged to direct a flow of coolant into open scoop passageways 24 and 26, see FIGURE 2.

Next within sleeve 140 is the outer ring of the bearing device 32 and then a spacer 147 having openings 148 is positioned to receive fluid passed off of the slinger plate 40. The outer bearing ring of the bearing device 43 is then located within the sleeve and another coolant distributing ring member 154, substantially identical to member 144, is positioned radially outwardly from the oil or coolant scoop 52 and forms with the adjacent outer bearing ring and sleeve 140 an annular manifold. The only difference between the coolant distributing ring members 144 and 154 is the thickness of the part engaging the sleeve 140. This ring member 154 should have the same operating position with oil scoop 52 as ring member 144 has with oil scoop 22. The annular manifolds of ring member 144 and 154 are fed a coolant by conduit means 200 which is connected to a coolant supply under pressure. An annular nut 156 fixes these members located in the sleeve 140 against the flange 142. Since the inner and outer rings of each bearing device are approximately the same length, and the spacers 38 and 147 are approximately the same length, the size of spacer member 18 is controlled to properly locate the ring members around their respective oil scoops so that the nozzles are aligned with the cooperating scoop passageways.

*Operation*

When shaft 2 is rotating in housing 4 and the coolant supply is being directed through conduit means 200 to the annular manifolds of ring members 144 and 154, the coolant is then passed through the nozzles 146 of both rings where it is directed to the open scoop passageways of both oil scoops 22 and 52. From the annular manifold connected to scoop passageway 24 the coolant flows through grooves 20, passageways 16, through the splines 12 to the passages 5. From the passages 5 the coolant flows through the annular passageway 7 to passageways 9. The coolant is directed from the passageways 9 angularly into the vanes 108 of the deflector plate 106. The coolant is then directed by the angular position of the vanes towards the carrier 78 and onto the point where the seal 82 rubs the seal plate 6.

From the annular manifold connected to scoop passageway 26 the coolant flows through the grooves in the inner surface of the inner rings 34 and 36 of the bearing device 32 to the passageways 42 in spacer 38. The coolant then passes over the slinger plate 40 and enters openings 148 into the spacer 147 and then passes through the openings in the sleeve 140 and back to a reservoir.

From the annular manifold connected to the scoop passageway adjacent seal plate 54 the coolant flows into annular groove 60 to passageways 58. The coolant is directed from the passageways 58 angularly onto the vanes of the deflector plate 130. The coolant is then directed by the angular position of the vanes towards the carrier 122 and onto the point where the seal 124 rubs the seal plate 54.

From the annular manifold connected to the scoop passageway adjacent inner bearing ring 46 the coolant flows through the grooves in the inner surface of the inner rings 46 and 44 of the bearing device 32 to the passageways 48 in spacer 38. The coolant then passes over the slinger plate 40 and enters openings 148 into the spacer 147 and then passes through the openings in the sleeve 140 and back to a reservoir.

It is to be understood that the invention is not limited to the specific description above or other specific figures, but may be used in other ways without departure from its spirit as defined by the following claims.

We claim:

1. A rotary shaft mounted for rotation in a housing comprising in combination, bearing means positioned between said shaft and said housing, said bearing means including an inner ring on said shaft, an annular coolant receiving means on said shaft, an annular seal plate mounted on said shaft on the other side of said annular coolant receiving means, means fixing said bearing means, coolant receiving means and seal plate against axial movement on said shaft, an annular seal member having a sealing surface engaging an annular side surface of said seal plate, said seal member being held by an annular carrier, said carrier being mounted for movement in an axial direction with relation to said housing, spring means biasing said carrier and seal member towards said seal plate, an annular deflector extending around the outer diameter of the seal plate, said annular deflector being fixed to said carrier, a coolant supply, means for conveying a coolant from said supply to the annular coolant receiving means, said seal plate having a plurality of radially extending passageways therethrough from adjacent the shaft to a point in line with the annular deflector, means for directing a coolant from the annular coolant receiving means to the radial passageways of the seal plate, said coolant being directed from said passageways at an angle against said annular deflector from each of the passageways, said deflector plate having vanes placed at an angle to the longitudinal axis of the shaft so that as the coolant from said passageways strikes said vanes it is directed to the area in which the sealing surface of the annular seal member engages the annular side surface of the seal plate.

2. A rotary shaft mounted for rotation in a housing comprising in combination, bearing means positioned between said shaft and said housing, said bearing means including an inner ring on said shaft, an annular coolant receiving means on said shaft, an annular seal plate mounted on said shaft on the other side of said annular coolant receiving means, means fixing said bearing means, coolant receiving means and seal plate against axial movement on said shaft, an annular seal member having a sealing surface engaging an annular side surface of said seal plate, said seal member being held by an annular carrier, said carried being mounted for movement in an axial direction with relation to said housing, spring means biasing said carrier and seal member towards said seal plate, an annular deflector extending around the outer diameter of the seal plate, said annular deflector being fixed to said carrier, a coolant supply, means for conveying a coolant from said supply to the annular coolant receiving means, said seal plate having a plurality of radially extending passageways therethrough from adjacent the shaft to a point in line with the annular deflector, means for directing a coolant from the annular coolant receiving means to the radial passageways of the seal plate, said passageways forming an angle of 45° with a radial line of said annular seal plate, said coolant being directed from said passageways at an angle against said annular deflector from each of the passageways, said deflector plate having vanes placed at an angle to the longitudinal axis of the shaft so that as the coolant from said passageway strikes said vanes it is directed to the area in which the sealing surface of the annular seal member engages the annular side surface of the seal plate.

3. A rotary shaft mounted for rotation in a housing comprising in combination, bearing means positioned between said shaft and said housing, said bearing means including an inner ring on said shaft, an annular coolant receiving means on said shaft, an annular seal plate mounted on said shaft on the other side of said annular coolant receiving means, means fixing said bearing means, coolant receiving means and seal plate against axial movement on said shaft, an annular seal member having a sealing surface engaging an annular side surface of said seal plate, said seal member being held by an annular carrier, said carrier being mounted for movement in an axial direction with relation to said housing, spring means biasing said carrier and seal member towards said seal plate, an annular deflector extending around the outer diameter of the seal plate, said annular deflector being fixed to said carrier, a coolant supply, means for conveying a coolant from said supply to the annular coolant receiving means, said seal plate having a plurality of radially extending passageways therethrough from adjacent the shaft to a point in line with the annular deflector, means for directing a coolant from the annular coolant receiving means to the radial pasageways of the seal plate, said coolant being directed from said passageways at an angle against said annular deflector from each of the passageways, said deflector plate having vanes placed at an angle to the longitudinal axis of the shaft so that as the coolant from said passageways strikes said vanes it is directed to the area in which the sealing surface of the annular seal member engages the annular side surface of the seal plate, said deflector plate having openings therein to prevent an overaccumulation of contact between the deflector plate and seal plate.

References Cited
UNITED STATES PATENTS 2,992,842    7/1961    Schevchenko _____ 308—76

MARTIN P. SCHWADRON, *Primary Examiner.*

F. SUSKO, *Assistant Examiner.*